United States Patent
Yasuda

(10) Patent No.: US 11,590,845 B2
(45) Date of Patent: Feb. 28, 2023

(54) SYSTEMS AND METHODS FOR CONTROLLING A HEAD-UP DISPLAY IN A VEHICLE

(71) Applicant: Toyota Research Institute, Inc., Los Altos, CA (US)

(72) Inventor: Hiroshi Yasuda, San Francisco, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 76 days.

(21) Appl. No.: 17/244,228

(22) Filed: Apr. 29, 2021

(65) Prior Publication Data
US 2022/0348078 A1  Nov. 3, 2022

(51) Int. Cl.
| | |
|---|---|
| *B60K 35/00* | (2006.01) |
| *B60W 50/14* | (2020.01) |
| *G02B 27/01* | (2006.01) |
| *G08G 1/0967* | (2006.01) |

(52) U.S. Cl.
CPC ............ *B60K 35/00* (2013.01); *B60W 50/14* (2013.01); *G02B 27/0101* (2013.01); *B60K 2370/1529* (2019.05); *B60K 2370/1575* (2019.05); *B60K 2370/178* (2019.05); *B60K 2370/52* (2019.05); *B60K 2370/741* (2019.05); *B60W 2050/146* (2013.01); *G02B 2027/0141* (2013.01); *G08G 1/0967* (2013.01)

(58) Field of Classification Search
CPC ............ B60K 35/00; B60K 2370/1529; B60K 2370/1575; B60K 2370/178; B60K 2370/741; B60K 2370/52; B60W 50/14; B60W 2050/146; G02B 27/0101; G02B 2027/0141; G08G 1/0967
See application file for complete search history.

(56) References Cited

U.S. PATENT DOCUMENTS

| | | | |
|---|---|---|---|
| 8,629,903 B2 | 1/2014 | Seder et al. | |
| 8,686,922 B2 | 4/2014 | Breed | |
| 9,247,779 B1 * | 2/2016 | Aloumanis | ............ G08G 1/167 |

(Continued)

FOREIGN PATENT DOCUMENTS

| | | | | |
|---|---|---|---|---|
| CN | 106463060 A | * | 2/2017 | ......... G06K 9/00335 |
| CN | 113126294 A | * | 7/2021 | |

(Continued)

OTHER PUBLICATIONS

U.S. Dot, "Preliminary Human Factors Guidelines for Crash Avoidance Warning Devices," NHTSA Project No. DTN22-91-C-07004, Jan. 1996, found at https://www.google.com/url?sa=t&rct=j&q=&esrc=s&source=web&cd=&ved=2ahUKEwjm8dL37PPuAhXYbc0KHb84DdwQFjABegQIARAD&url=https%3A%2F%2Frosap.ntl.bts.gov%2Fview%2Fdot%2F3183%2Fdot_3183_DS1.pdf%3F&usg=AOvVaw24lIqt0OInBU-KdAbCjsB-.

(Continued)

*Primary Examiner* — Chico A Foxx
(74) *Attorney, Agent, or Firm* — Christopher G. Darrow; Darrow Mustafa PC

(57) ABSTRACT

Systems and methods for controlling a head-up display (HUD) in a vehicle are disclosed herein. One embodiment deactivates the HUD in response to a command from a driver of the vehicle; assigns a level of urgency to an item of information associated with a current vehicular context; and activates the HUD to display the item of information to the driver, when the level of urgency exceeds a predetermined threshold.

20 Claims, 5 Drawing Sheets

(56) References Cited

U.S. PATENT DOCUMENTS

| | | | |
|---|---|---|---|
| 9,904,287 B1* | 2/2018 | Kuffner, Jr. | G05D 1/0061 |
| 2008/0195263 A1* | 8/2008 | Shehi | G01C 5/005 |
| | | | 701/4 |
| 2009/0284552 A1* | 11/2009 | Larson | G06F 3/012 |
| | | | 345/632 |
| 2010/0321488 A1* | 12/2010 | Soler | G08G 5/0021 |
| | | | 348/115 |
| 2011/0125397 A1* | 5/2011 | Lee | G01C 21/365 |
| | | | 701/533 |
| 2012/0306637 A1* | 12/2012 | McGough | B60K 37/06 |
| | | | 340/439 |
| 2014/0257659 A1 | 9/2014 | Dariush | |
| 2016/0363766 A1* | 12/2016 | Schmitz | G02B 27/0149 |
| 2017/0025005 A1* | 1/2017 | Barth | H04N 5/232945 |
| 2017/0043747 A1* | 2/2017 | Salter | B60S 1/048 |
| 2017/0060234 A1* | 3/2017 | Sung | G06F 3/147 |
| 2017/0076606 A1* | 3/2017 | Gupta | B60K 35/00 |
| 2017/0098132 A1* | 4/2017 | Yokota | G06T 7/194 |
| 2017/0134662 A1* | 5/2017 | Kosaka | B60K 35/00 |
| 2017/0305349 A1* | 10/2017 | Naboulsi | B60R 1/025 |
| 2018/0273050 A1* | 9/2018 | Tertoolen | G02B 27/0101 |
| 2018/0361925 A1* | 12/2018 | Rowell | B60Q 1/525 |
| 2019/0126821 A1* | 5/2019 | Ho | B60Q 9/008 |
| 2019/0355298 A1* | 11/2019 | Tseng | G09G 3/3225 |
| 2020/0017122 A1* | 1/2020 | Chatten | G01C 21/365 |
| 2021/0023991 A1* | 1/2021 | Tannenbaum | B60R 1/00 |
| 2021/0107552 A1* | 4/2021 | Ha | B62D 1/046 |
| 2022/0179223 A1* | 6/2022 | Thompson | G08G 5/0013 |
| 2022/0203996 A1* | 6/2022 | Katz | G06V 40/28 |

FOREIGN PATENT DOCUMENTS

| | | | | |
|---|---|---|---|---|
| DE | 102019118604 A1 * | 1/2020 | | B60K 35/00 |
| FR | 3052877 A1 * | 12/2017 | | B60K 35/00 |
| JP | 2019059245 A * | 4/2019 | | B60K 35/00 |
| KR | 20090075266 A * | 7/2009 | | G06F 1/329 |
| KR | 20170091259 A * | 8/2017 | | B60K 35/00 |
| WO | WO-2015197803 A2 * | 12/2015 | | B60K 35/00 |

OTHER PUBLICATIONS

R. Wood and P. Howells, "Head-Up Displays," Chapter 4 of The Avionics Handbook, CRC Press, 2001, found at https://www.davi.ws/avionics/TheAvionicsHandbook_Cap_4.pdf.

* cited by examiner

SYSTEMS AND METHODS FOR CONTROLLING A HEAD-UP DISPLAY IN A VEHICLE

TECHNICAL FIELD

The subject matter described herein generally relates to vehicles and, more particularly, to systems and methods for controlling a head-up display in a vehicle.

BACKGROUND

It is becoming increasingly common for a new vehicle to be equipped with a head-up display (sometimes also referred to as a "heads-up display") (HUD). A HUD permits the driver of a vehicle to see information such as current vehicle speed, outside or interior temperature, and navigation information (e.g., instructions to turn left at the next intersection) without looking away from the roadway ahead. Despite the usefulness of vehicle HUDs, some drivers find information displayed on a HUD to be annoying or distracting, so they deactivate the HUD. With the HUD deactivated, a driver might miss urgent and important items of information, including items pertaining to safety.

SUMMARY

An example of a system for controlling a head-up display (HUD) in a vehicle is presented herein. The system comprises one or more processors and a memory communicably coupled to the one or more processors. The memory stores a HUD deactivation module including instructions that when executed by the one or more processors cause the one or more processors to deactivate the HUD in response to a command from a driver of the vehicle. The memory also stores an urgency assessment module including instructions that when executed by the one or more processors cause the one or more processors to assign a level of urgency to an item of information associated with a current vehicular context. The memory also stores a HUD activation module including instructions that when executed by the one or more processors cause the one or more processors to activate the HUD to display the item of information to the driver, when the level of urgency exceeds a predetermined threshold.

Another embodiment is a non-transitory computer-readable medium for controlling a head-up display (HUD) in a vehicle and storing instructions that when executed by one or more processors cause the one or more processors to deactivate the HUD in response to a command from a driver of the vehicle. The instructions also cause the one or more processors to assign a level of urgency to an item of information associated with a current vehicular context. The instructions also cause the one or more processors to activate the HUD to display the item of information to the driver, when the level of urgency exceeds a predetermined threshold.

In another embodiment, a method of controlling a head-up display (HUD) in a vehicle is disclosed. The method comprises deactivating the HUD in response to a command from a driver of the vehicle. The method also includes assigning a level of urgency to an item of information associated with a current vehicular context. The method also includes activating the HUD to display the item of information to the driver, when the level of urgency exceeds a predetermined threshold.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

In various embodiments of a head-up display (HUD) control system, the system assesses the urgency or importance of various items of information associated with a current vehicular context that could potentially be displayed on a HUD that has previously been deactivated by a driver or other user. In various embodiments, the system activates the HUD to display items of information to the driver, if the level of urgency associated with those items exceeds a predetermined threshold. This solves the problem of a driver missing urgent safety warnings or other important information, if the driver has previously deactivated the HUD. In some embodiments, the system automatically deactivates the HUD once again after the HUD has displayed the urgent item(s) of information to the driver.

In some embodiments, the HUD control system detects and tracks the gaze direction of the driver, and the system displays urgent items of information in a portion of the field of view (FOV) of the HUD that coincides with the driver's detected gaze direction. In other words, the system displays the urgent item(s) of information on a specific portion of the HUD at which the driver's gaze is already directed to increase the probability that the driver will see the displayed information.

In other embodiments, if the HUD control system detects that the driver's gaze is directed somewhere other than within the FOV of the HUD (e.g., if the driver is looking out the driver-side window), the system can emit an audible signal of some kind (e.g., a tone, beep, or computer-generated spoken warning or message) in lieu of activating the HUD and displaying the urgent item of information on the HUD, or the system can emit the audible signal in addition to activating the HUD and displaying the urgent item of information.

In some embodiments, the driver or other user associated with the vehicle can configure the preferences of the HUD control system. Specifically, the system can receive, via a user interface, one or more preferences from the driver/user to configure the urgency associated with different types of items of information, the predetermined urgency threshold mentioned above, or both.

Figure 1:
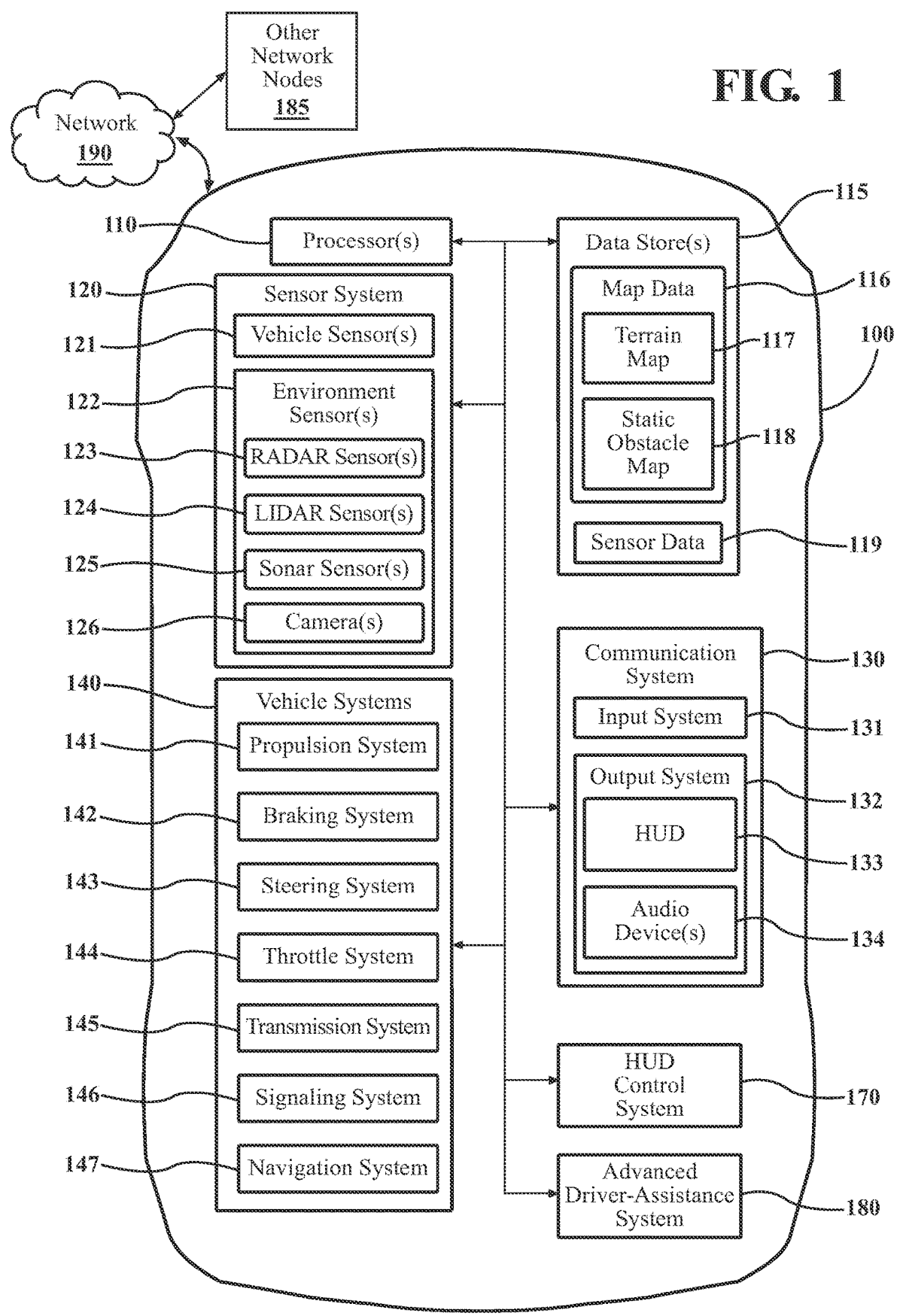
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. The vehicle 100 can include a HUD control system 170 or components and/or modules thereof. As used herein, a "vehicle" is any form of motorized transport. In one or more implementations, the vehicle 100 can be an automobile. In some implementations, the vehicle 100 may be any other form of motorized transport. The vehicle 100 can include the HUD control system 170 or capabilities to support or interact with the HUD control system 170 and thus benefits from the functionality discussed herein. While arrangements will be described herein with respect to automobiles, it will be understood that implementations are not limited to automobiles. Instead, implementations of the principles discussed herein can be applied to any kind of vehicle. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including HUD control system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more other network nodes 185 via a network 190. Such other network nodes 185 can include, for example, cloud servers, edge servers, roadside units (RSUs) or other infrastructure (e.g., traffic signals at intersections), users' mobile devices, and/or other connected vehicles. For example, vehicle 100 may receive traffic or weather information from one or more cloud or edge servers. In communicating with servers, vehicle 100 can use a technology such as cellular data. In communicating with other vehicles, vehicle 100 can use a technology such as Dedicated Short-Range Communications (DSRC) or Bluetooth Low Energy (Bluetooth LE).

Some of the possible elements of the vehicle 100 are shown in FIG. 1 and will be described in connection with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Vehicle 100 includes a sensor system 120. Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include vehicle-bus sensors that output, for example, speed and steering-angle data pertaining to vehicle 100. Sensor system 120 can also include one or more environment sensors 122. Environment sensors 122 can include radar sensor(s) 123, Light Detection and Ranging (LIDAR) sensor(s) 124, sonar sensor(s) 125, and camera(s) 126. The environment sensors 122 can be used, for example, to detect and recognize objects (e.g., other vehicles, pedestrians, cyclists, animals, traffic signs, obstacles, construction equipment, etc.) in the environment external to vehicle 100. Environment sensors 122 are particularly useful to support the functions of an Advanced Driver-Assistance System (ADAS) 180.

Vehicle 100 also includes a communication system 130. Communication system 130 includes an input system 131, and output system 132, and audio device(s) 134. Output system 132 can include one or more display devices. For example, output system 132 may include a center-console touchscreen display. In the various embodiments discussed herein, output system 132 includes a HUD 133. Output system 132 may include other display devices (not shown in FIG. 1) in addition to HUD 133.

As mentioned above, vehicle 100 includes an ADAS 180. ADAS 180 can use information obtained via sensor system 120, map data 116, and other sources (e.g., a traffic-information server or another connected vehicle) to predict or detect potentially hazardous traffic situations and to assist the driver of vehicle 100 in avoiding accidents. In some embodiments, ADAS 180 issues warnings or alerts so the driver can take corrective action. In other embodiments, ADAS 180 temporarily intervenes in the steering and/or acceleration of vehicle, when necessary, 100 to avoid an accident. For example, in some embodiments, ADAS 180 can detect that vehicle 100 is too close to a preceding (lead) vehicle in the same lane and issue a forward-collision warning and/or actively intervene by braking automatically to prevent vehicle 100 from rear-ending the preceding vehicle. Similar warnings and/or active interventions can apply to, for example, lane departure and potentially hazardous cross-traffic at an intersection.

Figure 2:
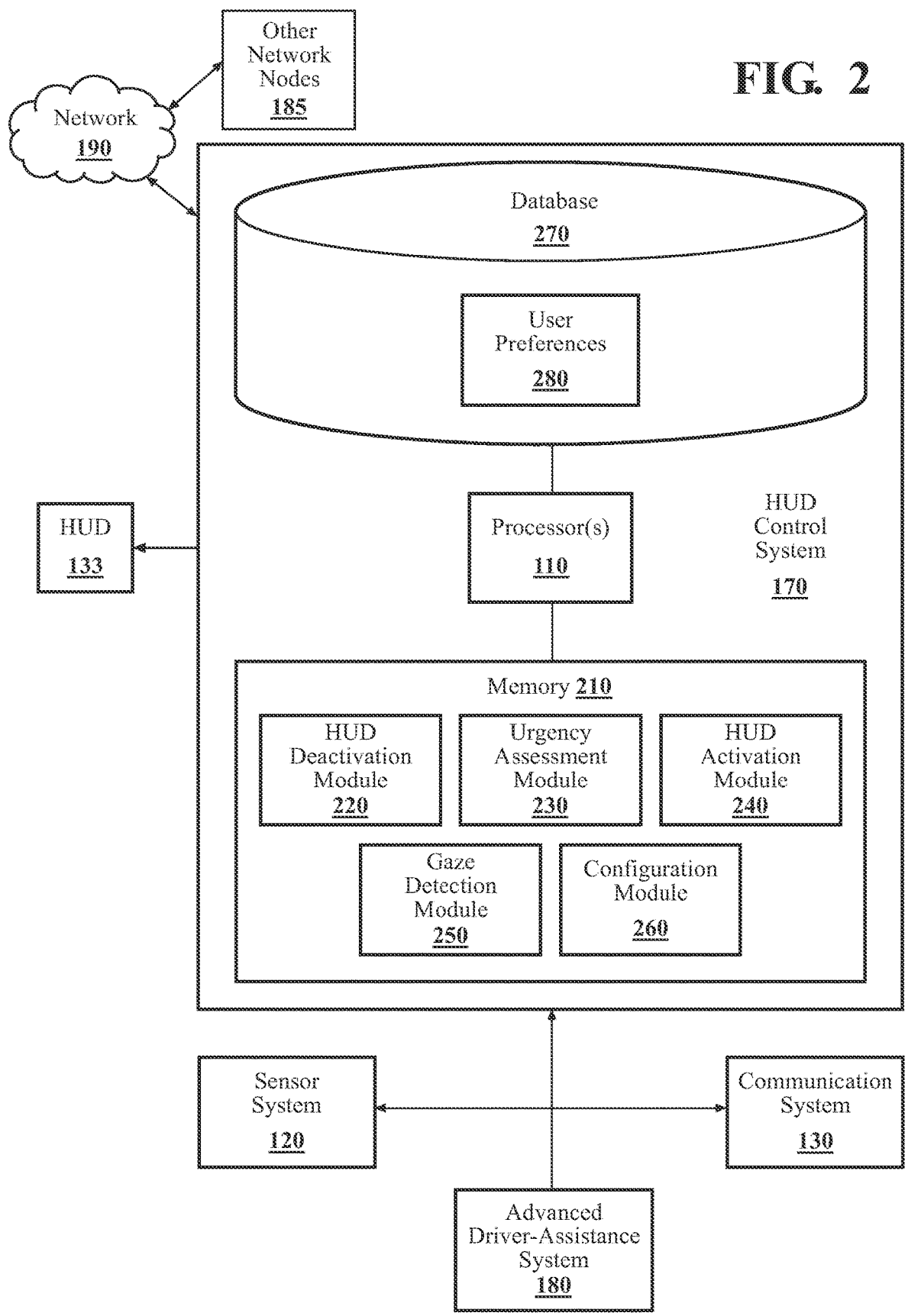
FIG. 2 is a functional block diagram of an embodiment of a head-up display control system.

Referring to FIG. 2, one embodiment of the HUD control system 170 of FIG. 1 is further illustrated. In this embodiment, HUD control system 170 is shown as including one or more processors 110 from the vehicle 100 of FIG. 1. In general, the one or more processors 110 may be a part of HUD control system 170, HUD control system 170 may include one or more separate processors from the one or more processors 110 of the vehicle 100, or HUD control system 170 may access the one or more processors 110 through a data bus or another communication path, depending on the embodiment.

In one embodiment, memory 210 stores a HUD deactivation module 220, an urgency assessment module 230, a HUD activation module 240, a gaze detection module 250, and a configuration module 260. The memory 210 is a random-access memory (RAM), read-only memory (ROM), a hard-disk drive, a flash memory, or other suitable memory for storing the modules 220, 230, 240, 250, and 260. The modules 220, 230, 240, 250, and 260 are, for example, computer-readable instructions that, when executed by the one or more processors 110, cause the one or more processors 110 to perform the various functions disclosed herein.

As shown in FIG. 2, HUD control system 170 interfaces with sensor system 120, communication system 130 (including, in particular, HUD 133), and ADAS 180 (refer to FIG. 1). In some embodiments, HUD control system 170 can also communicate with other network nodes 185 (e.g., cloud servers, edge servers, RSUs or other infrastructure systems, users' mobile devices, and/or other connected vehicles) via network 190, as discussed above in connection with FIG. 1.

HUD control system 170 can store data such as user preferences 280 in a database 270. User preferences 280 are discussed further below.

HUD deactivation module 220 generally includes instructions that when executed by the one or more processors 110 cause the one or more processors 110 to deactivate the HUD 133 in response to a command from a human driver of the vehicle 100. Depending on the embodiment, the human driver can issue the deactivation command via, for example, a button, a switch, a knob, or a touchscreen-based, menu-driven user interface. In other embodiments, the driver can deactivate the HUD 133 via a spoken command processed by a speech recognizer that interfaces with HUD deactivation module 220 or through a gesture (e.g., a motion of the hand) processed by a gesture-based user interface that interfaces with HUD deactivation module 220.

What it means for HUD 133 to be "deactivated" can differ, depending on the particular embodiment. In some embodiments, when the driver or other user deactivates HUD 133, HUD 133 is powered off. In a different embodiment, the driver or other user deactivating HUD 133 causes HUD 133 to enter a low-power standby mode. In such a low-power standby mode, the display is inactive and blank. In yet another embodiment, the driver or other user deactivating HUD 133 causes HUD 133 to enter a state in which it remains fully powered on but nevertheless has a blank display.

Urgency assessment module 230 generally includes instructions that when executed by the one or more processors 110 cause the one or more processors 110 to assign a level of urgency to an item of information associated with a current vehicular context (i.e., a context pertaining to vehicle 100). In general, a vehicular context involves (1) the current state or status (location, speed, heading, operational status of vehicle components or systems, etc.) of vehicle 100; (2) one or more environmental conditions external to vehicle 100 (e.g., vehicles, pedestrians, obstacles, weather conditions, traffic density, road conditions, etc.); or (3) a combination of the foregoing. For example, vehicle 100 having low tire pressure in one or more tires (a state or status of the vehicle) detected via a vehicle sensor 121 is one example of a vehicular context. Another example is the vehicle 100 approaching an intersection at which a pedestrian (an object detected by environment sensors 122) is crossing the street in front of the vehicle 100 in a crosswalk. Another example is the vehicle 100 traveling at 58 mph on a roadway that is wet due to a rainstorm. Yet another example is the vehicle 100 being at a particular location (e.g., expressed as GPS coordinates) and traveling 100 feet behind a detected preceding (lead) vehicle in the same lane of traffic. Vehicular contexts can be benign (low risk of danger) or hazardous (high risk of danger to vehicle 100 and its occupants or to other road users).

Urgency assessment module 230 assigns a level of urgency to items of information associated with a given vehicular context. In some embodiments, urgency assessment module 230 assigns a numerical urgency value or score (e.g., from 0 to 10 or from 0 to 100) to such items of information. In some embodiments, urgency assessment module 230 assigns a less granular urgency level of "low," "moderate," or "high" to items of information associated with a vehicular context. In some embodiments, these techniques are combined. For example, an item of information might have an urgency score of "25," placing it in the "low" urgency category. Another item of information might have an urgency score of "52," placing it in the "moderate" urgency category. Yet another item of information might have an urgency score of "83," placing it in the "high" urgency category.

A situation in which ADAS 180 outputs a forward-collision warning to HUD control system 170 indicating that vehicle 100 will rear-end a lead vehicle in five seconds, if corrective action is not taken, is an example of a potentially hazardous vehicular context. The directive "BRAKE!" that can be output to HUD 133 in this situation (after the HUD 133 has been activated) is an example of an item of information having a high level of urgency. In contrast, an item of information indicating that vehicle 100 is currently traveling 44 mph in a 45-mph speed zone has a relatively lower level of urgency. A driver who has deactivated HUD 133 for whatever reason is likely to want to see the former ("BRAKE!") appear on the reactivated HUD 133 but not the latter ("44 mph").

Other examples of urgent items of information include, without limitation, a textual or graphical message associated with a lane-departure warning received from ADAS 180, a textual or graphical message associated with a cross-traffic warning at an intersection received from ADAS 180, a severe-weather warning, a vehicle health warning (e.g., engine oil pressure, fuel level, electrical charge, engine coolant temperature, low tire pressure), a door open warning, a seat belt warning, a speed limit warning, and a navigation diagram (e.g., for an urgent notification concerning navigation, such as not proceeding onto a one-way street in the wrong direction). In some embodiments, a received text message or e-mail message marked as urgent by the sender or identified as such by an analysis of its content, can also receive a high assigned level of urgency from urgency assessment module 230. In the case of safety warnings from ADAS 180, the shorter the period of time until the undesirable event (e.g., a collision or lane departure) is predicted to occur, the higher the level of urgency assessment module 230 assigns to the associated item of information. Those skilled in the art will recognize that there is a close relationship between the level of urgency that urgency assessment module 230 assigns to an item of information and the level of risk (or danger) associated with the vehicular context to which that item of information pertains.

Other examples of items of information having a low associated level of urgency include, without limitation, GPS navigation information, reports of favorable weather conditions, speedometer readings, odometer readings, and outside-temperature readings.

HUD activation module 240 generally includes instructions that when executed by the one or more processors 110 cause the one or more processors 110 to activate the (previously deactivated) HUD 133 to display the item of information to the driver, when the level of urgency associated with the item of information exceeds a predetermined threshold. The predetermined threshold can differ, depending on the embodiment. For example, in one embodiment, the predetermined threshold is a numerical value with which a numerical urgency score assigned to the item of information by urgency assessment module 230 is compared. In another embodiment, the predetermined threshold can correspond to an urgency category such as "moderate." If an item of information is assigned a "high" urgency level by urgency assessment module 230, the urgency level exceeds the threshold level of "moderate," and HUD activation module 240 reactivates HUD 133 to display the item of information.

As those skilled in the art are aware, there are different kinds of HUDs used in vehicles. The various embodiments of a HUD control system 170 described herein can operate in conjunction with any of a variety of different types of HUDs. For example, in one embodiment, HUD 133 is a projection-based display system that projects text and graphics onto at least a portion of the windshield of vehicle 100. This is illustrated in FIG. 3.

Figure 3:
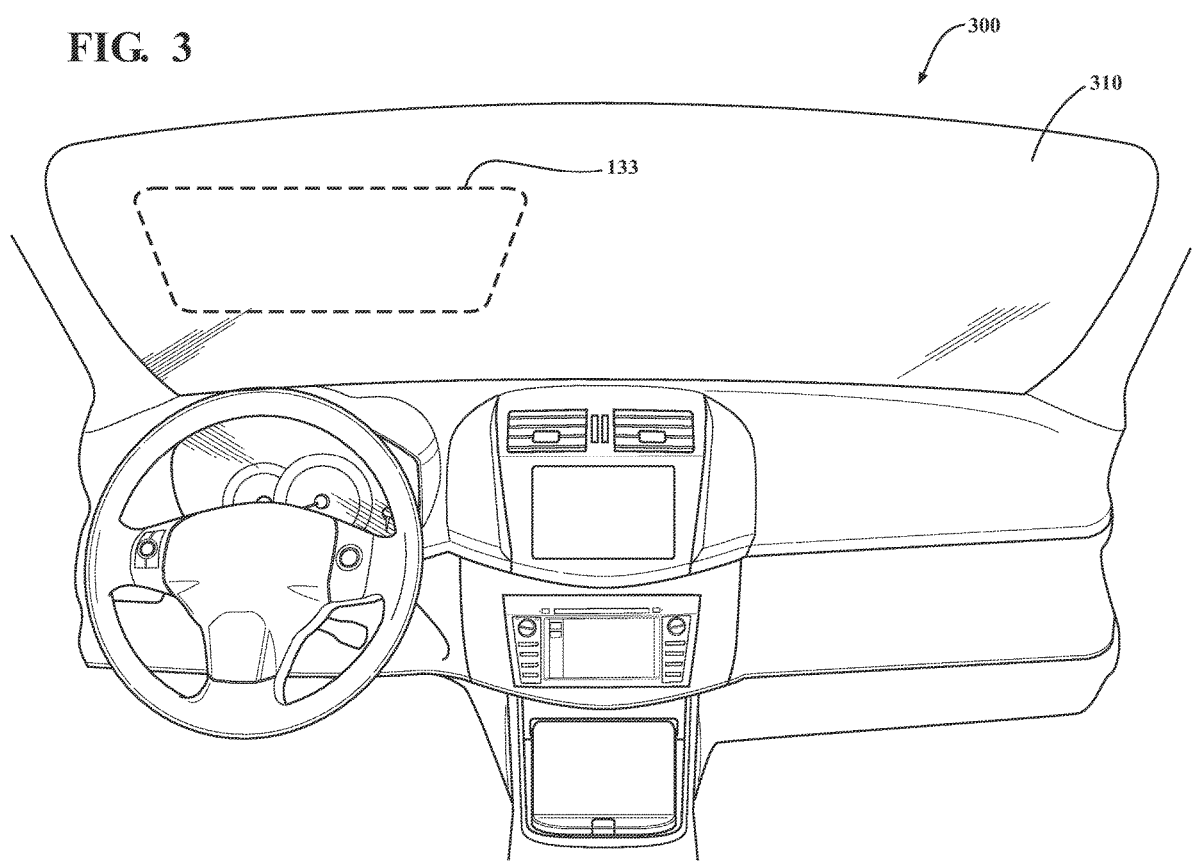
FIG. 3 illustrates an interior of a vehicle equipped with a head-up display, in accordance with an illustrative embodiment of the invention.

FIG. 3 illustrates an interior 300 of a vehicle 100 equipped with a HUD 133, in accordance with an illustrative embodiment of the invention. In this embodiment, the projection portion of HUD 133 (not shown in FIG. 3) can be located behind the instrument-cluster panel of vehicle 100. As those skilled in the art are also aware, optical techniques and apparatuses can be employed to make the displayed information or images appear as though they are farther away from the driver (i.e., farther away from the inside surface of the windshield) than they really are. In some embodiments, the field of view (FOV) of HUD 133 extends approximately 20 degrees to either side from the center of the display region, from the viewpoint of the driver sitting in the driver's seat. In other embodiments, the FOV of HUD 133 encompasses the entire windshield of vehicle 100. In the example shown in FIG. 3, the FOV of HUD 133 is limited to a particular portion of the windshield 310.

Figure 4:
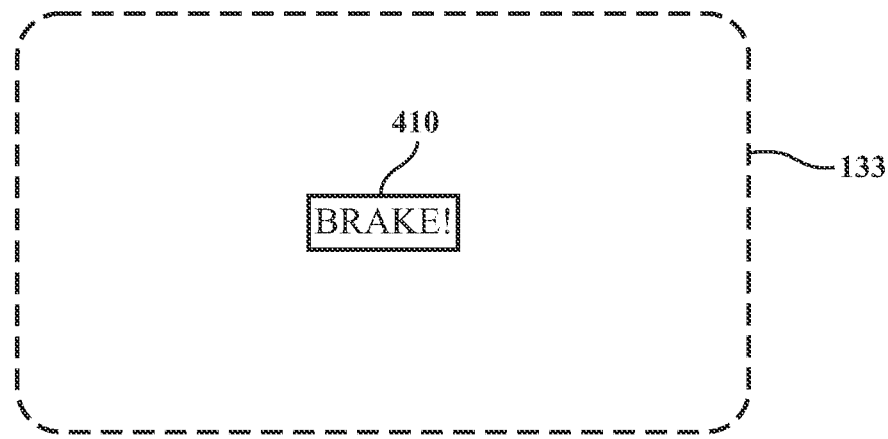
FIG. 4 illustrates an item of information displayed on a head-up display of a vehicle, in accordance with an illustrative embodiment of the invention.

FIG. 4 illustrates an item of information 410 displayed on HUD 133, in accordance with an illustrative embodiment of the invention. In the example of FIG. 4, urgency assessment module 230 has assigned a high level of urgency to the item of information 410 ("BRAKE!") associated with a forward collision warning received from ADAS 180. In this case, HUD activation module 240 has determined that the level of urgency associated with item of information 410 exceeds the predetermined threshold. Consequently, HUD activation module 240 activates HUD 133 to display the urgent item of information 410.

In some embodiments, HUD deactivation module 220, discussed above, includes further instructions that when executed by the one or more processors 110 cause the one or more processors 110 to automatically deactivate the HUD 133 after the HUD 133 has displayed the item of information 410 to the driver. How long an urgent item of information 410 remains visible on HUD 133 before the HUD 133 is again deactivated depends on the situation and the particular embodiment. In general, the item of information 410 remains displayed for as long as the vehicular context from which it arose is relevant to the driver of vehicle 100. This might be a few seconds, in some situations, or it could be somewhat longer, in other situations.

Gaze detection module 250 generally includes instructions that when executed by the one or more processors 110 cause the one or more processors 110 to detect the gaze direction of the driver of vehicle 100. To detect the driver's gaze direction, gaze detection module 250 can use a camera in the interior of vehicle 100 in conjunction with gaze-detection/tracking algorithms that are well known in the art. Some of these algorithms detect the direction in which the driver's eyes are pointing and determine, using geometric principles, what the driver is looking at within or external to the vehicle 100 (e.g., an external object through the windshield 310, an external object through a side window, the instrument panel, etc.). Detecting the gaze direction of the driver (i.e., the direction in which the driver is looking and what the driver is looking at) can support several additional features included in some embodiments of HUD control system 170.

For example, in one embodiment, the HUD activation module 240 includes further instructions that when executed by the one or more processors 110 cause the one or more processors 110 to display the item of information 410 in a portion of the FOV of the HUD 133 that coincides with the detected gaze direction (i.e., the portion of the windshield 310 through which the driver is currently looking). This is illustrated in FIG. 5.

Figure 5:
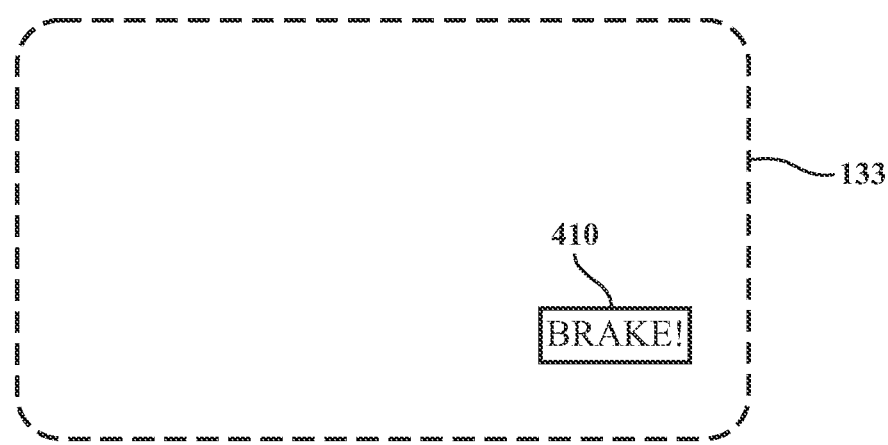
FIG. 5 illustrates an item of information displayed on a head-up display of a vehicle, in accordance with another illustrative embodiment of the invention.

FIG. 5 illustrates an item of information 410 ("BRAKE!") displayed on a HUD 133 of a vehicle 100, in accordance with an illustrative embodiment of the invention. In the example of FIG. 5, gaze detection module 250 has determined that the driver is currently looking through the portion of the windshield 310 where "BRAKE!" (an item of information 410 whose level of urgency has exceeded the predetermined threshold discussed above) is displayed. The projection portion of HUD 133 adjusts the location where the item of information 410 is displayed to match that detected location. This feature helps to ensure that the driver sees the item of information 410 associated with a forward-collision warning produced by ADAS 180.

In another embodiment, HUD activation module 240 includes further instructions that when executed by the one or more processors cause the one or more processors to emit an audible signal via audio device(s) 134, when the driver's detected gaze direction (detected by gaze detection module 250) does not lie within the FOV of the HUD 133. In other words, HUD activation module 240 causes an audible signal to be emitted if gaze detection module 250 detects that the driver is not looking at a location that lies within the FOV of the HUD 133. For example, as discussed above, if the driver is detected to be looking out the driver-side window, the HUD activation module 240 can cause an audible signal of some kind (e.g., a tone, beep, or computer-simulated spoken warning or message) to be emitted in lieu of activating the HUD 133 and displaying the urgent item of information 410 on the HUD 410. In a different embodiment, HUD activation module 240 can cause the audible signal to be emitted in addition to activating the HUD 133 and displaying the urgent item of information 410 on HUD 133 to draw the driver's attention to the displayed item of information 410.

Configuration module 260 generally includes instructions that when executed by the one or more processors 110 cause the one or more processors 110 to receive one or more preferences from the driver (or another user) to configure the level of urgency associated with various types of items of information 410, the predetermined urgency threshold, or both, depending on the embodiment. In some embodiments, configuration module 260 gives the driver some degree of control over the level of urgency that urgency assessment module 230 assigns to certain kinds of items of information 410 associated with particular vehicular contexts. For example, in one embodiment, a driver can choose to boost the urgency level of certain kinds of severe-weather warnings, especially if those types of severe-weather warnings are of particular concern in the region where the driver lives and works. For example, tornados are more common in certain regions of the U.S. than in others, and the driver might want to give those types of warnings a high priority.

In some embodiments, the driver can configure the urgency threshold, for at least some types of items of information 410, to control which items of information 410 lead to HUD activation module 240 activating the HUD 133 to display the items of information 410 after the driver has deactivated the HUD 133. For example, in one embodiment, the driver can specify that HUD 133 should be activated to display items of information 410 in a particular configurable category (e.g., "weather alerts") that have an urgency score greater than "75" (on a 0-to-100 scale). In another embodiment, the driver may specify that HUD 133 should be activated to display items of information 410 in a particular category that have a "high" level of urgency (in an urgency scheme including "low," "moderate," and "high"). In some embodiments, the urgency threshold is global across all types or categories of items of information 410. In other embodiments, there can be multiple different urgency thresholds for different types or categories of items of information 410.

Figure 6:
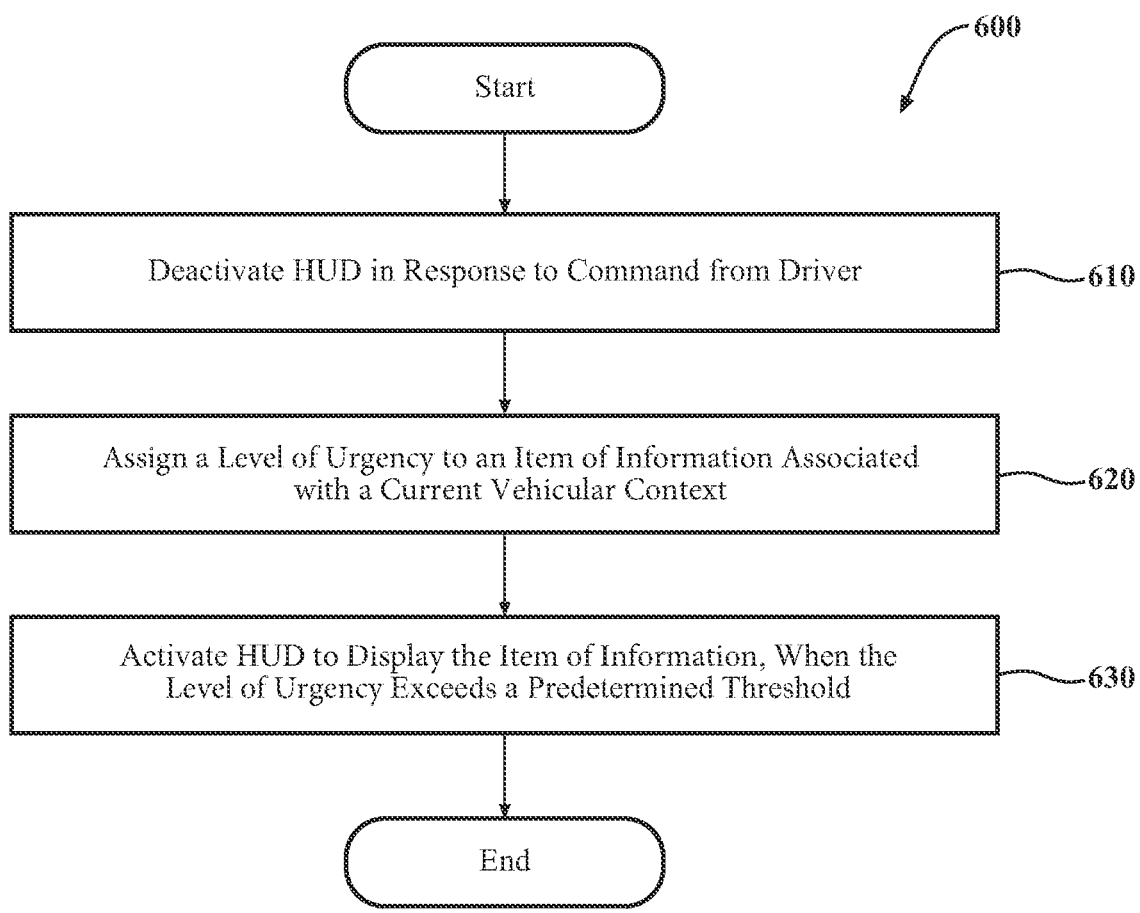
FIG. 6 is a flowchart of a method of controlling a head-up display in a vehicle, in accordance with an illustrative embodiment of the invention.

FIG. 6 is a flowchart of a method 600 of controlling a HUD 133 in a vehicle, in accordance with an illustrative embodiment of the invention. Method 600 will be discussed from the perspective of HUD control system 170 in FIG. 2. While method 600 is discussed in combination with HUD control system 170, it should be appreciated that method 600 is not limited to being implemented within HUD control system 170, but HUD control system 170 is instead one example of a system that may implement method 600.

At block 610, HUD deactivation module 220 deactivates the HUD 133 in response to a command from a driver of the vehicle 100. As discussed above, depending on the embodiment, the driver can issue the deactivation command via, for example, a button, a switch, a knob, or a touchscreen-based, menu-driven user interface. In other embodiments, the driver can deactivate the HUD 133 via a spoken command processed by a speech recognizer that interfaces with HUD deactivation module 220 or through a gesture (e.g., a motion of the hand) processed by a gesture-based user interface that interfaces with HUD deactivation module 220.

At block 620, urgency assessment module 230 assigns a level of urgency to an item of information 410 associated with a current vehicular context. As discussed above, in some embodiments, urgency assessment module 230 assigns a numerical urgency value or score (e.g., from 0 to 10 or from 0 to 100) to items of information 410. In some embodiments, urgency assessment module 230 assigns a less granular urgency level of "low," "moderate," or "high" to items of information associated with a vehicular context. In some embodiments, these techniques are combined, as explained above.

At block 630, HUD activation module 240 activates the HUD 133 to display the item of information 410 to the driver, when the level of urgency associated with the item of information 410 exceeds a predetermined threshold. As discussed above, in one embodiment, the predetermined threshold is a numerical value with which a numerical urgency score assigned to the item of information 410 by urgency assessment module 230 is compared. In another embodiment, the predetermined threshold can correspond to an urgency category such as "moderate." If an item of information is assigned a "high" urgency level by urgency assessment module 230, the urgency level exceeds the threshold level of "moderate," and HUD activation module 240 reactivates HUD 133 to display the item of information.

In some embodiments, method 600 also includes the HUD deactivation module 220 automatically deactivating the HUD 133 after the HUD 133 has displayed the item of information 410 to the driver, as discussed above. In some embodiments, method 600 makes use of a gaze detection module 250 that detects the gaze direction of the driver to support HUD activation module 240 in displaying urgent items of information 410 in a portion of the FOV of the HUD 133 that coincides with the driver's detected gaze direction. In some embodiments, method 600 includes HUD activation module 240 emitting an audible signal, when the gaze direction of the driver detected by gaze detection module 250 does not lie within the FOV of the HUD 133. Depending on the particular embodiment, the audible signal can be emitted in combination with displaying an urgent item of information 410 (e.g., the audible signal being used to draw the driver's attention to the HUD 133), or the audible signal can be emitted in lieu of activating HUD 133 and displaying such an item of information 410. In some embodiments, method 600 includes configuration module 260 receiving one or more preferences from the driver to configure the level of urgency that gets assigned to various types of items of information 410 by urgency assessment module 230, the predetermined threshold discussed above, or both.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and/orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as a HUD 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 can be operatively connected to communicate with the various vehicle systems 140 and/or individual components thereof. For example, returning to FIG. 1, the one or more processors 110 can be in communication to send and/or receive information from the various vehicle systems 140 to control the movement, speed, maneuvering, heading, direction, etc. of the vehicle 100.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by the one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for controlling a head-up display (HUD) in a vehicle, the system comprising: one or more processors; and a memory communicably coupled to the one or more processors and storing:
    a HUD deactivation module including instructions that when executed by the one or more processors cause the one or more processors to deactivate the HUD, into a deactivate state, in response to a command from a driver of the vehicle to disable the HUD from displaying information related to vehicular context during operation of the vehicle;
    an urgency assessment module including instructions that when executed by the one or more processors cause the one or more processors to assign a level of urgency to an item of information associated with a current vehicular context; and
    a HUD activation module including instructions that when executed by the one or more processors cause the one or more processors to activate the HUD, from the deactivated state, to display the item of information to the driver, when the level of urgency exceeds a predetermined threshold to alert the driver of the urgency of the current vehicular context.

2. The system of claim 1, wherein the HUD deactivation module includes further instructions that when executed by the one or more processors cause the one or more processors to automatically deactivate the HUD after the HUD has displayed the item of information to the driver.

3. The system of claim 1, further comprising a gaze detection module including instructions that when executed by the one or more processors cause the one or more processors to detect a gaze direction of the driver, wherein the HUD activation module includes further instructions that when executed by the one or more processors cause the one or more processors to display the item of information in a portion of a field of view of the HUD that coincides with the gaze direction.

4. The system of claim 1, wherein the item of information is one of a forward collision warning received from an Advanced Driver-Assistance System (ADAS) of the vehicle, a lane-departure warning received from the ADAS, and a cross-traffic warning received from the ADAS.

5. The system of claim 1, wherein the item of information is one of a severe-weather warning, a vehicle health warning, a door open warning, a seat belt warning, a speed limit warning, a navigation diagram, a text message, and an e-mail message.

6. The system of claim 1, further comprising a gaze detection module including instructions that when executed by the one or more processors cause the one or more processors to detect a gaze direction of the driver, wherein the HUD activation module includes further instructions that when executed by the one or more processors cause the one or more processors to emit an audible signal, when the gaze direction does not lie within a field of view of the HUD.

7. The system of claim 1, wherein the HUD, when deactivated, is one of powered off, in a low-power standby mode, and powered on with a blank display.

8. The system of claim 1, further comprising a configuration module including instructions that when executed by the one or more processors cause the one or more processors to receive one or more preferences from the driver to configure at least one of the level of urgency and the predetermined threshold.

9. A non-transitory computer-readable medium for controlling a head-up display (HUD) in a vehicle and storing instructions that when executed by one or more processors cause the one or more processors to:
deactivate the HUD, into a deactivate state, in response to a command from a driver of the vehicle to disable the HUD from displaying information related to vehicular context during operation of the vehicle;
assign a level of urgency to an item of information associated with a current vehicular context; and
activate the HUD, from the deactivated state, to display the item of information to the driver, when the level of urgency exceeds a predetermined threshold to alert the driver of the urgency of the current vehicular context.

10. The non-transitory computer-readable medium of claim 9, wherein the instructions include further instructions that cause the one or more processors to detect a gaze direction of the driver and to display the item of information in a portion of a field of view of the HUD that coincides with the gaze direction.

11. The non-transitory computer-readable medium of claim 9, wherein the item of information is one of a forward collision warning received from an Advanced Driver-Assistance System (ADAS) of the vehicle, a lane-departure warning received from the ADAS, and a cross-traffic warning received from the ADAS.

12. The non-transitory computer-readable medium of claim 9, wherein the item of information is one of a severe-weather warning, a vehicle health warning, a door open warning, a seat belt warning, a speed limit warning, a navigation diagram, a text message, and an e-mail message.

13. A method of controlling a head-up display (HUD) in a vehicle, the method comprising:
deactivating the HUD, into a deactivate state, in response to a command from a driver of the vehicle to disable the HUD from displaying information related to vehicular context during operation of the vehicle;
assigning a level of urgency to an item of information associated with a current vehicular context; and
activating the HUD, from the deactivated state, to display the item of information to the driver, when the level of urgency exceeds a predetermined threshold to alert the driver of the urgency of the current vehicular context.

14. The method of claim 13, further comprising automatically deactivating the HUD after the HUD has displayed the item of information to the driver.

15. The method of claim 13, further comprising:
detecting a gaze direction of the driver; and
displaying the item of information in a portion of a field of view of the HUD that coincides with the gaze direction.

16. The method of claim 13, wherein the item of information is one of a forward collision warning received from an Advanced Driver-Assistance System (ADAS) of the vehicle, a lane-departure warning received from the ADAS, and a cross-traffic warning received from the ADAS.

17. The method of claim 13, wherein the item of information is one of a severe-weather warning, a vehicle health warning, a door open warning, a seat belt warning, a speed limit warning, a navigation diagram, a text message, and an e-mail message.

18. The method of claim 13, further comprising:
detecting a gaze direction of the driver; and
emitting an audible signal, when the gaze direction does not lie within a field of view of the HUD.

19. The method of claim 13, wherein the HUD, when deactivated, is one of powered off, in a low-power standby mode, and powered on with a blank display.

20. The method of claim 13, further comprising receiving one or more preferences from the driver to configure at least one of the level of urgency and the predetermined threshold.

* * * * *

UNITED STATES PATENT AND TRADEMARK OFFICE
CERTIFICATE OF CORRECTION

PATENT NO. : 11,590,845 B2
APPLICATION NO. : 17/244228
DATED : February 28, 2023
INVENTOR(S) : Hiroshi Yasuda It is certified that error appears in the above-identified patent and that said Letters Patent is hereby corrected as shown below:

In the Claims

Claim 1, Column 16, Line 24, replace "deactivate" with "deactivated"

Claim 9, Column 17, Line 18, replace "deactivate" with "deactivated"

Claim 13, Column 18, Line 5, replace "deactivate" with "deactivated"

Signed and Sealed this
Ninth Day of May, 2023

Katherine Kelly Vidal
*Director of the United States Patent and Trademark Office*